3,806,439
REFERENCE ELECTRODE CONSTRUCTION
Truman S. Light, Lexington, and Nicholas E. Doyle, Jr., Norwood, Mass., assignors to The Foxboro Company Foxboro, Mass.
Filed Oct. 5, 1972, Ser. No. 295,404
Int. Cl. G01n 27/30
U.S. Cl. 204—195 F    4 Claims

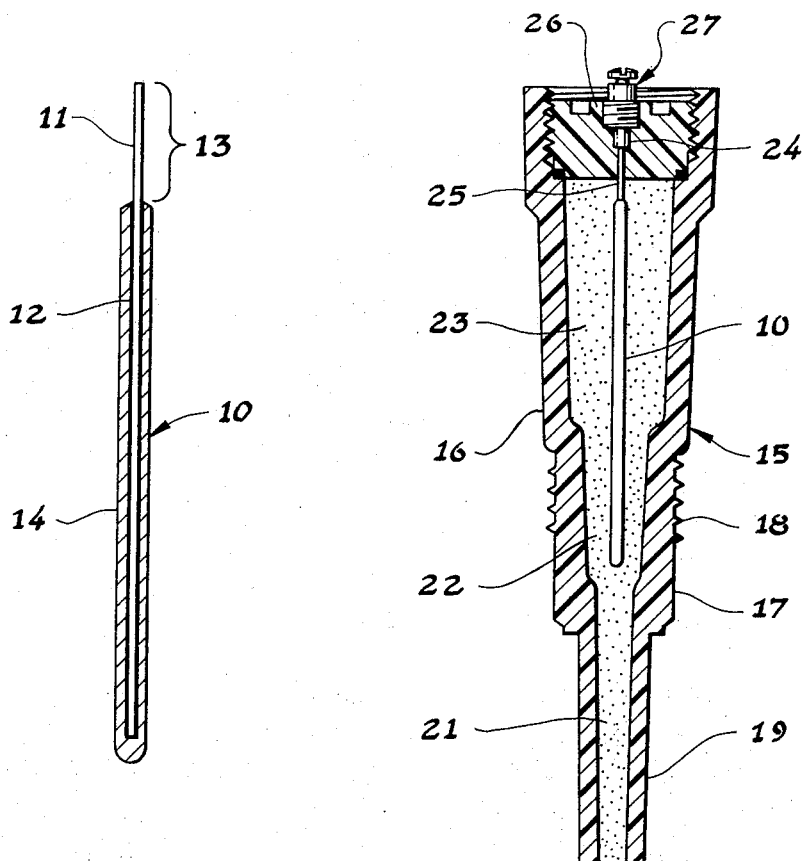

ABSTRACT OF THE DISCLOSURE

An industrial process type of reference electrode having a silver-silver chloride inner electrode comprising a silver wire on which is deposited an anodized coating of silver chloride and several coatings of a mixture of silver chloride and potassium chloride applied by dipping the anodized silver wire into a molten solution of the mixture. The inner electrode thus economically constructed is self-supporting and has a desirably low electrical resistance.

FIELD OF THE INVENTION

This invention relates generally to an industrial process type of reference electrode having a silver-silver chloride or the like inner electrode which is economically reproducible to chose performance tolerances, including low electrical resistance and is self-supporting for ready insertion into the assembled reference electrode.

DESCRIPTION OF THE PRIOR ART

Applicants' inner electrode of the reference electrode includes, as one element of the novel combination, a silver wire on which is deposited an anodized coating of silver chloride or the like suitable halide salt. The anodizing process is carried out by using the same chloride salt as the electrolyte that is used in the reference electrode. The use of an anodized metal electrode in a like manner is well known to the applicants and is described in an article co-authored by one of the applicants which was published in "Analytical Chemistry," volume 39, January 1967, pages 70–75.

Applicants' inner electrode of the reference electrode also includes, as one element of the novel combination, coatings of a mixture of silver chloride and potassium chloride or the like applied by dipping the anodized metal conductor into a molten solution of the mixture. Jerrold-Jones et al., U.S. Pat. No. 3,354,069 discloses the application of coating of silver chloride by immersing a metal conductor having a porous unitary body of compressed powdered metal into which molten silver chloride is immersed. Applicants have achieved a transition surface by the anodizing process rather than the more costly process of compressing a unitary body of powdered silver. Applicants also save the additional cost of the excess amount of expensive silver in powdered form. Further, Jerrold-Jones et al. do not mention or suggest the use of a mixture which applicants use to reduce the electrical resistance of the coating of silver chloride. Because of the high electrical resistance of the silver chloride, the coating applied to the Jerrold-Jones electrode must be severely limited in thickness.

Proctor, Jr., U.S. Pat. No. 3,657,096, disclosed a reference electrode made by drawing molten silver chloride into a supporting tube with the silver chloride directly in contact with a silver wire. The Proctor, Jr., electrode is not self-supporting but depends upon the supporting tube. Inasmuch as the temperature at which silver chloride is molten, Proctor, Jr., is limited in the materials he may use for the supporting tube to those which will withstand the molten salt. Further, Proctor, Jr., does not mention or suggest the use of a mixture which applicants use to reduce the electrical resistance of the silver chloride. In order to reduce the electrical resistance of his electrode, Proctor, Jr., extends the silver wire so that an end thereof is directly in contact with the electrolyte of the reference electrode. Applicants' means for reducing the specific electrical resistance avoids the deleterious effects resulting from such a structure.

Kirsten, U.S. Pat. No. 3,676,319, discloses a reference electrode which utilizes a mixture of silver chloride and potassium chloride crystals to reduce the temperature hysteresis of the electrode. Although Kirstein recognized that reference electrodes containing a silver conductor which has been coated with a silver halide by immersion into a bath of molten silver chloride suffers the disadvantage of exhibiting high electrical resistance, he does not mention or suggest producing his electrode by immersion of the conductor into a molten mixture of silver chloride and potassium chloride, or suggest that by doing so his electrode would have a low electrical resistance. He points out that in his electrode the rate of compression is a factor in determining the final physical properties of the mixture. As will be later herein pointed out, the applicants' use of the dipping method produces more uniform results on a more economical basis.

SUMMARY OF THE INVENTION

An industrial process type of reference electrode must be constructed in such a manner that it will remain stable for long periods of time without continual need of calibration or replacement. It must also be able to perform satisfactorily under rugged physical conditions and in a wide variety of chemicals being processed at varying temperatures, pressures and rates of flow. Further, this type of electrode must be such that it can be economically reproduced to exacting performance specifications. In addition to the above, part of being commercially successful requires that such an electrode be usable when connected to existing amplifying and measuring equipment.

It is the principal object of this invention to provide a rugged industrial process type of reference electrode capable of use in a wide variety of chemicals and under varying physical conditions.

It is another object of this invention to provide such a reference electrode which may be manufactured economically with control to close performance tolerances.

It is a further object of this invention to provide an industrial process type of reference electrode having an inner electrode with a low electrical resistance that is usable with a variety of existing measuring apparatus.

It is still a further object of the invention to provide a self-supporting inner electrode which is readily inserted into the reference electrode assembly.

It is yet another object of this invention to provide an industrial process type of reference electrode which is stable for long periods of time with a minimum of recalibration of the system of which this reference electrode is a part.

One aspect of this invention relates to the construction and manufacturing procedures for producing the inner electrode. The inner electrode comprises a silver wire on which is deposited an anodized coating of silver chloride to provide a transition surface for the adhesion of the first of several coatings of a mixture of silver chloride and potassium chloride applied by dipping the anodized silver wire into a molten solution of the mixture. The anodizing and dip coatings may be performed economically and under closely controlled conditions, making it simple to produce the inner electrodes in quantity lots to close performance standards. By the proper selection and control of the mixture of silver chloride and potassium chloride, the electrical resistance of the inner electrode may be maintained at a desirably low value which makes it practical to use the reference electrode with a variety of existing measuring apparatus. The problems due to the electrical resistance of a reference electrode are discussed in an article which was published in ISA Journal, vol. 13, No. 2, February 1966, pages 60–66.

Another aspect of this invention is the construction of the industrial process type of reference electrode comprising a highly chemical resistant body having sealed in one end a porous ceramic plug, a filling of potassium chloride and silver chloride crystal into which the novel self-supporting inner electrode is inserted through a sealed plug. The reference electrode is completed by evacuating the air from the body through the porous plug and filling, also through the porous plug, with an aqueous solution saturated with respect to both potassium chloride and silver chloride.

DESCRIPTION OF THE DRAWING

The objects and advantages of this invention will be more fully understood from the description taken in connection with the accompanying drawings, wherein:

FIG. 1 shows a sectional view of a preferred embodiment of the inner electrode according to this invention, and FIG. 2 shows a sectional view of a preferred embodiment of the industrial process type reference electrode according to this invention.

DESCRIPTION OF THE PREFERRED EMBODIMENTS

Rferring to FIG. 1, the inner electrode structure 10 of the industrial process type reference electrode includes a wire 11 made of a chemically active metal such as a highly pure silver. Following normal cleaning and anodizing procedures, a coating of a halide of the metal of the wire 11 such as silver chloride is applied to the wire 11 on its entire length except for the end 13. The anodizing has advantageously been performed in an electrolyte of the type used in the reference electrode in which inner electrode 10 is used, such as potassium chloride. The coating 12 may be in the order of .0005 inch thick and provides a satisfactory bond between the wire 11 on the one hand and its transition outer surface provides a bond between the anodized coating 12 and the later layers of silver chloride applied thereto in the manner about to be described, on the other hand.

Crystals of silver chloride and potassium chloride are carefully weighed to prescribed proportions. By careful experimentation, it has been found that a minimum of ½% by weight of potassium chloride in the mixture will materially reduce the electrical resistance of a sufficiently thick coating applied to the coating 12 to meet the requirements of an inner electrode of an industrial process type reference electrode as will be later herein discussed.

The mixture of silver chloride and potassium chloride is melted in a crucible. Inasmuch as silver chloride and potassium chloride may be melted without decomposition, the molten mixture retains the same proportions as the salts in the crystalline state. With the molten mixture maintained at a temperature of from 500 to 550° C., the anodized wire 11 is dipped into the molten mixture to a depth less than the length of the coating 12. The crucible is provided with a heat sink to ensure that the temperature of the molten mixture will remain constant during the dipping process, especially when a number of wires 11 are dipped simultaneously into the molten mixture. The rate of immersing the wire 11 into the molten mixture, the duration of time therein and the rate of withdrawal may be determined experimentally. Once established, the coating 14 applied by the dipping process will be uniform in thickness and homogeneous throughout its entire length.

Upon withdrawing the coated wire 11 from the molten mixture, it is held in a heated still atmosphere close to a heat sink to control its rate of cooling. When the coating 14 has solidified and is at the proper temperature, another coating is applied to the wire 11 by repeating the dipping procedure. With proper care, each of the several coatings may be applied free from cracks or defects to create a single homogenous and uniformly thick single coating of the thickness desired.

Referring to FIG. 2, the industrial process type reference electrode 15 includes a tubular body 16 made of a chemically resistant plastic such as a bisphenol—a fumarate polyester reinforced with glass fibers. The midsection 17 of the body 16 includes threads 18 and is so shaped as to provide a means for mounting the reference electrode 15 in a process pipe or vessel in a sealed manner. When thus mounted, the section 19 extends into the process pipe or vessel and is exposed to the process fluid. A porous ceramic plug 20 is cemented in the recessed end of section 19. This plug 20 has advantageously the optimum porosity to permit the transfer of ions from the process fluid to the inner electrolyte wetting the pores.

The interior of tubular body 16 provides interconnected passages 21, 22, and 23 which are filled with a mixture of crystals of potassium chloride and silver chloride, leaving only a small unfilled space at the outer end of passage 23. Advantageously, the ratio of potassium chloride to silver chloride by weight is about 18 to 1.

In preparation for the final assembly of the reference electrode 15, an O-ring 24 is inserted into passage 25 of the plastic cap 26. The end 13 of the inner electrode 10 is then pushed through the passage 25, and the terminal 27 is attached thereto by a crimping operation. Terminal 27 is made of a highly pure silver to reduce any possibility of generating any deleterious contact potentials at its junction with wire 11. The assembled terminal 27 and inner electrode 10 is then positioned in plastic cap 26 shown in FIG. 2. The inner electrode 10 is gently inserted into the mixture in the body 16 and the cap 26 screwed in place, using an O-ring 28 and epoxy cement to seal the joint between the body 16 and the cap 26.

The reference electrode 15 is then filled with an aqueous solution saturated with respect to both potassium chloride and silver chloride by placing the section 19 in a beaker, located in a chamber and generating a vacuum in the chamber to evacuate the air from the interior of the reference electrode 15 through the porous ceramic plug 20. The aqueous solution is then introduced into the beaker. Upon bringing the pressure on the aqueous solution, it is forced through the porous ceramic plug 20 into the interior of the reference electrode 15, wetting the mixture of crystals therein and the inner electrode 10.

An industrial process type reference electrode is exposed to widely varying temperatures, as for example as high as 110° C. As the temperature changes, the saturation point of the aqueous solution of potassium chloride and silver chloride also change. Hence, it is essential to have an excess of each of the salts present in the solid state to ensure that the solutions will remain saturated at all temperatures. Silver chloride coating 14 from the inner electrode 10 will go into the solution as well as the loose crystals in the solid state. However, when the reverse occurs, the silver chloride from the inner electrode will precipitate, thus slowly eroding the coating 14 from the inner electrode 10. In view of this, the coating 14 must be sufficiently thick to provide for a stable operation of the reference electrode 15 for a reasonably long period of time under industrial process conditions.

Experimentally, the resistance of a reference electrode having a coating of silver chloride applied to the inner electrode by dipping the electrode into molten silver chloride was found to be 40,000 ohms at 25° C. The resistance of the reference electrode using an inner electrode made according to this invention with a coating having 1% potassium chloride was found to be 600 ohms at 25° C. This drastic reduction in resistance made the reference electrode usable with existing measuring systems designed for low impedance reference electrodes. A reference electrode made in accordance with this invention is economical to manufacture in reasonable quantities to close performance tolerances. In the dipping process, for example, it is necessary to inspect only the first inner electrode and the last one dipped in a batch of molten solution. Thus, inspection need be performed only when additions are made to a batch of molten solution or a new batch is prepared. The inner electrode uses a minimum of expensive highly pure silver. The dipping process is simple and repeatably produces inner electrodes to close performance tolerances. It eliminates such problems as achieving uniform mixtures of dry crystals or slurries and the variations inherent with compression methods.

In the foregoing specification, the preferred embodiment of the invention has been described. It will be readily apparent to those skilled in the art that other metals and related halides and alkali metal halides may be substituted for the silver-silver chloride and potassium chloride, such as, for example, silver bromide, silver iodide, potassium bromide, potassium iodide and the like.

What is claimed is:

1. An inner electrode for immersion in an alkali metal halide solution of an industrial process type reference electrode comprising:
   a silver member,
   a coating of silver halide on the surface of said silver member, and
   a coating of a solid homogeneous mixture of silver halide and an alkali metal halide on said coating of silver halide.

2. An industrial process type reference electrode inner electrode in accordance with claim 1 in which said mixture is silver chloride and potassium chloride.

3. An industrial process type reference electrode inner electrode in accordance with claim 2 in which said mixture of silver chloride and potassium chloride comprised at least one half of a percent by weight of potassium chloride.

4. An industrial process type reference electrode having a body of chemically resistant material arranged so one end thereof may be inserted into a process stream of the fluid to be measured,
   a porous plug sealed in the one end of said body so that the outer surface of said plug is exposed to said process fluid,
   an inner electrode having a silver conductor and a coating of silver halide thereon,
   an electrical terminal attached to said silver conductor,
   a plastic plug,
   said silver conductor of the inner electrode extending through and hermetically sealed in said plastic plug with said terminal on one side thereof,
   a mixture of crystals of an alkali metal halide with crystals of silver halide substantially filling the interior of said body,
   said plastic plug being hermetically sealed to said body with said inner electrode projecting into said mixture of crystals, and
   an aqueous solution saturated with respect to both said alkali metal halide and silver halide filling the internal space of said body,
   the improvement of the inner electrode comprising:
      a coating of a solid homogeneous mixture of silver halide and said alkali metal halide on said coating of silver halide.

References Cited
UNITED STATES PATENTS

| 3,006,821 | 10/1961 | Haring | 204—56 R |
| 3,591,482 | 7/1971 | Neff et al. | 204—195 F |
| 3,676,319 | 7/1972 | Kirsten | 204—195 F |
| 3,354,069 | 11/1967 | Jerrold-Jones et al. | 204—195 F |

TA-HSUNG TUNG, Primary Examiner

U.S. Cl. X.R.

204—56 R; 117—69, 113, 128, 219